3,139,408
PROCESS FOR PREPARING RANEY NICKEL
                CATALYST
Huseyin V. Tumer, Izmir, Turkey, and Edwin R. Cousins,
  New Orleans, La., assignors to the United States of
  America as represented by the Secretary of Agriculture
  No Drawing. Filed Dec. 21, 1961, Ser. No. 161,318
            8 Claims. (Cl. 252—466)

A non-exclusive, irrevocable, royalty-free license in the invention herein described, for all governmental purposes, throughout the world, with the power to grant sublicenses for such purposes, is hereby granted to the Government of the United States of America.

This invention relates to a process for preparing a nickel catalyst. More particularly, the invention provides a process for preparing an improved Raney nickel catalyst suitable for the hydrogenation of glyceride oils.

It is an important object of this invention to prepare a Raney catalyst of greatly enhanced activity for the hydrogenation of glyceride oils.

Another object of this invention is to provide a process for preparing a Raney nickel catalyst of greatly superior stability as compared to the usual Raney catalysts.

A third object of this invention is to provide a process in which the final activity of the prepared Raney catalyst in the hydrogenation of glyceride oils is uniform and does not vary with the starting alloy.

A fourth object of this invention is to provide a liquid medium for the storage of the prepared catalyst.

A further object of this invention is to provide a process for preparing a catalyst that will hydrogenate glyceride oils without being limited to a continuous process or the use of huge excesses of catalyst.

In general, the preparation of the improved Raney nickel catalyst that is the subject of this invention is carried out by treating an alkali-digested and water-washed standard Raney nickel-aluminum alloy in water suspension successively with a reagent that is a proton acceptor and a reagent that is a proton donor. Following treatment with the indicated reagents and removal of both the treating reagents and the catalyst-suspending liquid the catalyst preparation is ready for use. Alternatively, the improved catalyst preparation can be stored in dioxane until such time as it is needed.

It has long been suspected that the activity of catalysts prepared from similar Raney alloys could vary significantly (J. Am. Chem. Soc., 71, 3769, 1949). Our work has confirmed these suspicions. For example, catalysts prepared by exactly the same procedure from alloys of the same general composition (50% Ni–50% Al) and tested for activity under identical conditions varied as much as fivefold in their ability to hydrogenate glyceride oils. Also the usual Raney catalyst is far inferior in regard to hydrogenation rate when compared with the usual commercial nickel catalysts prepared by either dry reduction of a nickel compound such as nickel hydroxide or wet reduction of nickel compounds such as nickel formate. A Raney nickel catalyst is generally used because of the simplicity of the preparation.

It is also well known that the catalyst prepared from a Raney nickel alloy does not retain its activity for long in storage. Invariably, the highly active nickel reacts with the storage medium, usually water or ethanol, with a subsequent loss of activity (J. Am. Chem. Soc., 70, 695, 1948 and "Newer Methods of Preparative Organic Chemistry," Interscience Publishers, Inc., New York, N.Y., 1948). It is undoubtedly for this reason that the catalyst is sold as the alloy, which is very stable. The alloy is digested just before use.

Another disadvantage of a Raney catalyst as usually prepared is that it can be used only one time. Often, in fact, there is a noticeable drop in activity during the course of a first run with a freshly prepared catalyst.

Our preferred digestion procedure follows a well known standard preparation of Raney nickel (T. P. Hilditch, "The Chemical Constitution of Natural Fats," John Wiley and Sons, Inc., New York, N.Y., 1947, pp. 517–518). Briefly, 10 g. of alloy was slowly added (in two hours) with occasional stirring to an ice-cold solution of 10 g. of sodium hydroxide in 40 ml. of water. The mixture was then heated in an oil bath for two hours at 120° C., after which 13 ml. of a 20% sodium hydroxide solution was added and the mixture was continuously stirred at 120° C. for another three hours. The catalyst was washed by decanting ten times with distilled water. The catalyst was then transferred to a medium grade fritted-glass funnel and continuously washed by filtering through it 12 liters of water. After the water washing the catalyst was washed successively with 450 ml. portions each of 95% ethanol and absolute ethanol. Each ethanol washing was divided into at least three smaller washings and the catalyst was filtered practically to dryness between each washing. A dioxane wash immediately followed and was performed in the same manner as the ethanol washes.

Although the preferred procedure is one employing a high temperature digestion of the alloy we do not mean to limit our invention to such conditions. A very greatly improved catalyst results when our method is applied to catalysts prepared by a low temperature digestion as recommended by Adkins and Billica (J. Am. Chem. Soc., 70, 695, 1948). For example, increases in relative activity as great as elevenfold have resulted from treating such a low temperature digestion catalyst by our method, that is from the rate of 0.105 ml. of hydrogen per g. of oil per minute for the original catalyst to 1.250 ml. for the treated catalyst.

In a typical treatment freshly prepared catalyst was stirred in an acetaldehyde solution at room temperature for 16 hours, and then the acetaldehyde treated catalyst was reacted with a 20% acetic acid solution by volume in water for 5 minutes at 40° C. After the acid treatment, the catalyst was washed in the usual manner with water, ethanol, and dioxane. The various solvents were not removed completely from the catalyst for any of the treatments. The catalyst after treatment with acetaldehyde was filtered on a fritted-glass funnel and then treated with acetic acid. The acetaldehyde, acetic acid, and ethanol were the purest grades available. In all treatments the quantities of the catalyst and treating solution were not critical; it was only necessary to have an excess of the solutions. Usually 5–10 g. of catalyst and 50 ml. of solution were satisfactory. The acetaldehyde was used as a 20% solution by volume in absolute ethanol.

The range of conditions in which the above treatments are operable is quite broad. Acetaldehyde treatments have been successful at temperatures from 5° C. to 40° C., at concentrations from a trace to 50% by volume, and over time intervals of two hours to weeks. Acid treatments were successfully employed at temperatures from 25° C. to 60° C., at concentrations from 10% to 50% by volume, and over time intervals from 5 to 15 minutes.

A commercially refined, bleached, and deodorized cottonseed oil (I.V. 109.5) was used as the substrate in all hydrogenations. The hydrogenations were carried out in an essentially all glass system (J. Am. Oil Chemists' Soc. 37, 267, 1960). All hydrogenations were carried out batch-wise at either 70° C. with 3% nickel or 170° C. with 0.5% nickel. The activity of the catalyst was gauged by the amount of hydrogen consumed by the oil in at least two 15 minute intervals during the early phases of the hydrogenations. For very fast rates readings were taken at 5 minute intervals. Relative activities were calculated as the milliliters of hydrogen absorbed per minute by a gram of oil.

The process described in this invention results in the preparation of a Raney nickel catalyst with a rate of hydrogenation for glyceride oils of a order of magnitude equal to, or exceeding that obtained with wet or dry reduced catalysts. For example, the relative activity of a supported commercial catalyst prepared by dry reduction of electrolytic nickel hydroxide was 0.900 ml. of hydrogen per gram of oil per minute, while under the same conditions of hydrogenation a Raney nickel catalyst prepared by our preferred method hydrogenated at a rate of 1.600 ml. of hydrogen per gram of oil per minute. Again, as an example of the uniform activities produced by our process, in a series of preparations using low temperature digestions, the relative activities of the conventionally prepared catalysts were 0.028, 0.143, and 0.050 ml. of hydrogen per gram of oil per minute, compared to 0.226, 0.255, and 0.289 ml. of respectively for these same catalyst preparations after our treatment.

We have found dioxane to be a superior medium for the storage of the catalyst. For example, when stored in dioxane there is little change in the activity of the catalyst after a month and a half. Two aliquots of a catalyst were stored for this length of time in a refrigerator, one in dioxane, the other in absolute ethanol. When used in hydrogenations at 170° C., the sample stored in dioxane had a relative activity of 0.107 ml./g. min., the one from alcohol had fallen to 0.027 ml./g. min. The original activity had been 0.129 ml./g. min.

A catalyst prepared as described in our process possesses the further advantage of retaining its activity in use. Our catalysts have been used in as many as four consecutive hydrogenations of glyceride oils without appreciable loss in activity.

We do not mean for our invention to be limited to the particulars described in the discussions. These were conditions taken from numerous catalyst preparations and hydrogenation runs, and are meant to represent the preferred conditions, not the only conditions. Several obvious modifications will suggest themselves to those skilled in the art. For example the use of solvents in the hydrogenation reaction and the use of various carriers for the nickel in the preparation of the catalyst immediately come to mind.

We do not wish to limit our invention to the use of acetaldehyde and acetic acid as catalyst conditioners. Acetaldehyde, acetone, and other compounds containing carbonyl groups, or compounds capable of forming carbonyl groups in the presence of the catalyst are preferred catalyst treating reagents in our process, but those skilled in the art of organic reaction mechanisms will readily understand that materials containing the carbonyl group or materials containing trivalent nitrogen, are equally operable as proton acceptors. Acetic acid and hydrochloric acid are preferred catalyst treating reagents but it is obvious that other materials that will function as proton donors are operable in our process. Also other media instead of dioxane, that do not contain a carbonyl group or will not form a carbonyl group when in contact with the catalyst will serve as a storage medium. An obvious choice for a storage medium would be a glyceride oil, particularly if the catalyst were to be used in the hydrogenation of such oils. Such a storage oil could be partially, or completely, hydrogenated so as to form a solid at room temperature, thus further protecting the catalyst.

Having thus described our invention, we claim:

1. A process for preparing an improved hydrogenation catalyst from a Raney nickel-aluminum alloy which improved hydrogenation catalyst exhibits enhanced and uniform catalytic activity and is capable of reuse without loss of catalytic activity, comprising the following steps:
    (a) digesting a Raney nickel-aluminum alloy in alkali,
    (b) washing the digested product free from alkali with water,
    (c) treating the digested and washed product of step (b) in suspension first with a reagent that is a proton acceptor and subsequently with a reagent that is a proton donor,
    (d) washing the treated product of step (c) free from the treating reagents with water.

2. The process of claim 1 wherein the proton acceptor is a member of the group consisting of acetaldehyde and acetone and the proton donor is a member of the group consisting of acetic acid and hydrochloric acid.

3. The process of claim 1 wherein the reagent acting as a proton acceptor is acetaldehyde and the reagent acting as a proton donor is acetic acid.

4. The process of claim 1 wherein the reagent acting as a proton acceptor is acetone and the reagent acting as a proton donor is acetic acid.

5. The process of claim 1 wherein the reagent acting as a proton acceptor is acetaldehyde and the reagent acting as a proton donor is hydrochloric acid.

6. The process of claim 1 wherein the reagent acting as a proton acceptor is acetone and the reagent acting as a proton donor is hydrochloric acid.

7. A process for preparing an improved catalyst from a Raney nickel-aluminum alloy which improved hydrogenation catalyst exhibits enhanced and uniform catalytic activity, is capable of reuse without loss of catalytic activity, and is stable with respect to catalytic activity during prolonged storage comprising the following steps:
    (a) digesting a Raney nickel-aluminum alloy in alkali,
    (b) washing the digested product free from alkali with water,
    (c) treating the digested and washed product of step (b) in suspension—first with a reagent that is a proton acceptor and subsequently with a reagent that is a proton donor,
    (d) washing the treated product of step (c) free from treating reagents with water,
    (e) washing the product from step (d) with an alcohol to remove water, and
    (f) then washing the alcohol-washed product with dioxane.

8. The process of claim 7 wherein the proton acceptor is a member of the group consisting of acetaldehyde and acetone and the proton donor is a member of the group consisting of acetic acid and hydrochloric acid.

References Cited in the file of this patent

UNITED STATES PATENTS

| | | |
|---|---|---|
| 2,481,238 | Pierce et al. | Sept. 6, 1949 |
| 2,604,455 | Reynolds et al. | July 22, 1952 |
| 2,950,260 | Rosenbaum et al. | Aug. 23, 1960 |
| 2,980,632 | Malley et al. | Apr. 18, 1961 |